(No Model.)
W. H. WHITE.
NUT LOCK.
No. 587,664. Patented Aug. 3, 1897.
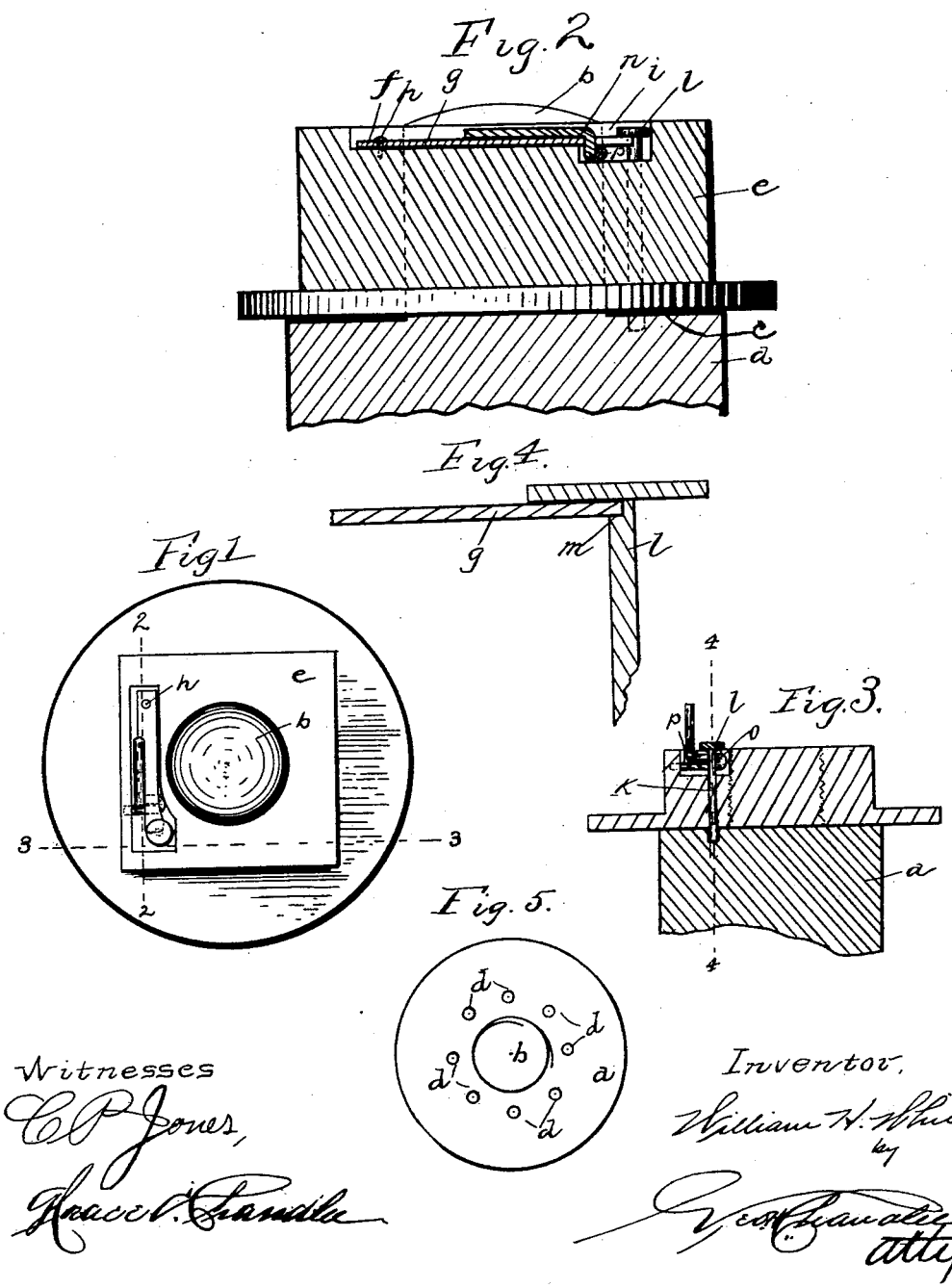
Witnesses
C. P. Jones,
Grace V. Randle
Inventor,
William H. White
by
Geo. Randle
Atty.

UNITED STATES PATENT OFFICE.

WILLIAM H. WHITE, OF HARROLD, SOUTH DAKOTA, ASSIGNOR OF ONE-FOURTH TO JAMES A. FRENCH, OF PLEASANT, SOUTH DAKOTA.

NUT-LOCK.

SPECIFICATION forming part of Letters Patent No. 587,664, dated August 3, 1897.

Application filed August 27, 1896. Serial No. 604,110. (No model.)

*To all whom it may concern:*

Be it known that I, WILLIAM H. WHITE, a citizen of the United States, residing at Harrold, in the county of Hughes, State of South Dakota, have invented certain new and useful Improvements in Nut-Locks; and I do hereby declare the following to be a full, clear, and exact description of the invention, such as will enable others skilled in the art to which it appertains to make and use the same.

My invention relates to nut-locks in general and more particularly to those designed for use in connection with axles of vehicles, though it will be readily understood that my device may be employed in connection with any construction in which the body bearing the threads engaged by the nut is provided with a shoulder projecting outwardly from the base of the threaded portion or in which the threaded portion is contracted.

In the drawings forming a portion of this specification and in which like letters of reference indicate similar parts in the several views, Figure 1 is a top view of a threaded body provided with a nut equipped with my lock. Fig. 2 is a section on line 2 2 of Fig. 1, the flange of the nut being shown in perspective. Fig. 3 is a section on line 3 3 of Fig. 1, and Fig. 4 is a section on line 4 4 of Fig. 3. Fig. 5 is an end view of an axle with nut removed.

Referring now to the drawings, $a$ indicates an axle having a contracted threaded extremity $b$, resulting in the formation of a shoulder $c$, which latter is provided with a series of facial depressions $d$, for purpose as will be hereinafter explained.

In the top of the nut $e$ is formed a depression $f$, in which is arranged a flat spring $g$, which latter is secured firmly in the depression at one of its ends through the medium of a pin $h$. This spring $g$ extends throughout the depression $f$, and its free end extends into a further depression $i$, directly adjacent the depression $f$.

In the bottom of the depression $i$ is formed a perforation $k$, which extends downwardly and through the nut $e$, and is in alinement successively with the depression $d$ in the shoulder of the axle, as the nut is revolved upon the threaded portion of the latter.

In the perforation $k$ is arranged a headed pin $l$, in the side of which and directly below the head is formed a transverse slot $m$, in which the adjacent end of the spring $g$ is seated, the lower end of the pin being in engagement with one of the depressions $d$ when said spring is in its lowest position, as shown in Fig. 2 of the drawings.

In order to raise the pin $l$ from engagement with the perforation $d$, I have provided a novel cam contrivance consisting of a wire $n$, which is bent downwardly at a right angle, then laterally at a right angle, and then turned and brought back parallel with the last-named section. This wire in its normal position lies with its body upon the broadened rear portion of the spring $g$, the first angular extension thereof passing downwardly into the depression $i$ in the nut, while the second and third bend $o$ and $p$, respectively, thereof pass under the spring. The section $p$ is somewhat longer than the section $o$ and its extremity enters a depression in the side wall of the depression $i$ of the nut to hold the wire in its position.

The operation of my device is as follows: The wire $n$ being in position shown in Fig. 2 the nut is firmly locked in place, and it being desired to release the nut said wire is raised to the position shown in Fig. 3, when it will turn upon the section $p$, and bringing the section $o$ above the latter the said section will engage and raise the spring $g$, and at the same time the spring being in engagement with the pin $l$ the latter will be raised from the depression $d$, when the nut may be revolved and removed.

In applying the nut the wire $n$ may be allowed to retain its raised position until the nut is seated and be then lowered to seat the pin $l$, or the wire may be lowered, when the effect of the spring $g$ will be to hold the pin depressed, so that it will ride over the shoulder $c$ of the axle and drop into a perforation $d$.

Having thus described my invention, what I claim, and desire to secure by Letters Patent, is—

1. The combination with a threaded body provided with perforations of a nut having a pin adapted to enter said perforations, a spring in engagement with the pin, and an eccentric lever arranged to engage the spring to raise the pin and to subsequently engage and depress the spring to lower the pin.

2. The combination with a threaded body provided with perforations of a nut having a pin arranged to engage said perforations, a spring in engagement with the pin, a pivoted lever having a laterally-projecting cam lying beneath the spring and adapted to engage and raise it to lift the pin, when in one position said lever being formed to engage and depress the spring when in an opposite position.

In testimony whereof I affix my signature in presence of two witnesses.

WILLIAM H. WHITE.

Witnesses:
H. C. SHOBER,
S. DREW.